US012056638B2

(12) United States Patent
Sood et al.

(10) Patent No.: US 12,056,638 B2
(45) Date of Patent: Aug. 6, 2024

(54) SYSTEMS AND METHODS FOR ALLOCATING VEHICLES TO RIDE REQUESTS (71) Applicant: Blu-Smart Mobility Private Limited, Ahmedabad (IN)

(72) Inventors: Rishabh Sood, Chandigarh (IN); Gurpreet Singh Walia, Patiala (IN); Anmol Singh Jaggi, Ahmedabad (IN)

(*) Notice: Subject to any disclaimer, the term of this patent is extended or adjusted under 35 U.S.C. 154(b) by 0 days.

(21) Appl. No.: 17/180,002

(22) Filed: Feb. 19, 2021

(65) Prior Publication Data

US 2022/0270013 A1  Aug. 25, 2022

(51) Int. Cl.
*G06Q 10/0631* (2023.01)
*G01C 21/34* (2006.01)
*G06Q 50/40* (2024.01)

(52) U.S. Cl.
CPC ... *G06Q 10/06315* (2013.01); *G01C 21/3407* (2013.01); *G06Q 50/40* (2024.01)

(58) Field of Classification Search
CPC .... G08G 1/123; G08G 1/202; G01C 21/3438; G01C 21/3469; G01C 21/3461; G06Q 50/30; G06Q 10/02; B61L 3/006; B60R 25/20
See application file for complete search history.

(56) References Cited

U.S. PATENT DOCUMENTS

| 2014/0309920 A1 | 10/2014 | Ricci |
| 2017/0363432 A1 | 12/2017 | Hall et al. |
| 2019/0095849 A1 | 3/2019 | Sweeney et al. |

(Continued)

FOREIGN PATENT DOCUMENTS

| DE | 102019132735 A1 * | 6/2020 | ........... G01C 21/343 |
| EP | 3437063 A1 | 2/2019 | |
| WO | 2006011158 A2 | 2/2006 | |

OTHER PUBLICATIONS

W. Tu, et al. "Real-Time Route Recommendations for E-Taxies Leveraging GPS Trajectories," Transactions on Industrial Informatics, vol. 17, No. 5, pp. 3133-3142, May 2021, doi: 10.1109/TII.2020.2990206 [online], <https://ieeexplore.ieee.org/document/9079205?source=IQplus> (Year: 2020).*

(Continued)

*Primary Examiner* — Jerry O'Connor
*Assistant Examiner* — Michael R Koester
(74) *Attorney, Agent, or Firm* — RC Trademark Company (57) ABSTRACT Disclosed is system and method for allocating vehicles to ride requests. A ride request comprising information indicative of a pickup location and a drop location of a given ride is received. Vehicle information of a plurality of currently-available vehicles, driver information of respective drivers of the plurality of currently-available vehicles and fuel-station information of the one or more of the plurality of fuel stations is accessed. A distance to empty for each of the plurality of currently-available vehicles is predicted based on the vehicle information. One or more eligible vehicles that satisfy eligibility criteria are selected from amongst the plurality of currently-available vehicles. A vehicle from amongst the one or more eligible vehicles that is nearest to the pickup location is allocated.

11 Claims, 2 Drawing Sheets

(56) References Cited

U.S. PATENT DOCUMENTS

| | | | | |
|---|---|---|---|---|
| 2020/0160478 A1* | 5/2020 | Ramot | ................. | G01C 21/343 |
| 2021/0110323 A1* | 4/2021 | Munoz | ............. | G06Q 10/06311 |
| 2021/0209542 A1* | 7/2021 | Magazinik | ..... | G06Q 10/063118 |
| 2021/0255633 A1* | 8/2021 | McKenzie | ......... | G01C 21/3407 |

OTHER PUBLICATIONS

First Examination Report issued in IN Patent Application No. IN202021039910 on Dec. 2, 2021, 8 pages.

Notification of Transmittal of the International Search Report and the Written Opinion of the International Searching Authority, or the Declaration mailed on Dec. 20, 2021, 11 pages.

* cited by examiner

SYSTEMS AND METHODS FOR ALLOCATING VEHICLES TO RIDE REQUESTS

TECHNICAL FIELD

The present disclosure relates to systems for allocating vehicles to ride requests. The present disclosure also relates to methods for allocating vehicles to ride requests. The present disclosure also relates to computer program products for allocating vehicles to ride requests.

BACKGROUND

The rise of smartphones and the advent of app store lead to huge change in urban mobility. Ridesharing and carpooling; meal delivery and freight; electric bikes and scooters; and self-driving cars and urban aviation have brought about a revolution in the field of transportation.

Ride sharing services (also referred to as on-demand ride services) are marketplaces where consumers (riders) and service providers (drivers) can connect with each other. A major challenge for the ride sharing services is how to achieve optimum vehicle allocation, wherein utilization of vehicle is increased by serving more ride requests, whilst minimizing the total mileage. Another challenge is that drivers often end up working beyond their shift timings. Moreover, there are instances when the vehicle has to stop for refuelling purposes during an ongoing trip. Such an unscheduled stop adversely affects customer experience. Furthermore, a longer travel time due to unoptimized vehicle allocation and routing typically corresponds to a higher utilization of fuel by the vehicle, which in turn corresponds to higher fuel expenses. In a particular case, a fleet of vehicles may include electric vehicles. In such a case, the electric vehicles may vary a lot compared to internal combustion engine (ICE) cars when it comes to fuelling of the vehicles. The time it takes to charge an electric vehicle can be as little as 30 minutes or more than 12 hours depends on numerous factors, namely, size of the battery, power rating of the charging points etc. Thus, charging time becomes an even bigger matter of consideration in case of electric vehicles.

Therefore, in light of the foregoing discussion, there exists a need to overcome the aforementioned drawbacks associated with ride allocations.

SUMMARY

The present disclosure relates to systems for allocating vehicles to ride requests. The present disclosure also relates to methods for allocating vehicles to ride requests. The present disclosure also relates to computer program products for allocating vehicles to ride requests.

In a first aspect, an embodiment of the present disclosure provides a system for allocating vehicles to ride requests, wherein the system comprises a server arrangement and a database arrangement, the server arrangement being coupled in communication with a plurality of rider devices, a plurality of driver devices, a plurality of vehicles and a plurality of fuel stations, the database arrangement storing information pertaining to a plurality of riders associated with respective rider devices, a plurality of drivers associated with respective driver devices, the plurality of vehicles and the plurality of fuel stations, wherein the server arrangement is configured to:

receive, from a given rider device, a ride request comprising information indicative of a pickup location and a drop location of a given ride;

identify one or more of the plurality of fuel stations within a predefined distance from the drop location;

access, from the database arrangement,
  vehicle information of a plurality of currently-available vehicles, wherein vehicle information of a given vehicle comprises at least one of: a current status of fuel, a current location, a state of health, a vehicle specification of the given vehicle;
  driver information of respective drivers of the plurality of currently-available vehicles, wherein driver information of a given driver comprises shift timings of the given driver;
  fuel-station information of the one or more of the plurality of fuel stations, wherein fuel-station information of a given fuel station comprises at least one of: a status of fuel availability, a current queue, a location, a fuel-station specification of the given fuel station;

predict a distance to empty for each of the plurality of currently-available vehicles based on the vehicle information;

select, from amongst the plurality of currently-available vehicles, one or more eligible vehicles that satisfy eligibility criteria, the eligibility criteria being satisfied by a vehicle when:
  a sum of a distance from a current location of the vehicle to the pickup location, a distance from the pickup location to the drop location and a distance from the drop location to a nearest available fuel station is less than the distance to empty for the vehicle, and
  the ride is expected to be completed before a current shift of a driver of the vehicle ends; and allocate a vehicle from amongst the one or more eligible vehicles that is nearest to the pickup location.

In a second aspect, an embodiment of the present disclosure provides a method for allocating vehicles to ride requests, the method comprising:

receiving, from a given rider device, a ride request comprising information indicative of a pickup location and a drop location of a given ride;

identifying one or more of a plurality of fuel stations within a predefined distance from the drop location;

accessing, from a database arrangement,
  vehicle information of a plurality of currently-available vehicles, wherein vehicle information of a given vehicle comprises at least one of: a current status of fuel, a current location, a state of health, a vehicle specification of the given vehicle;
  driver information of respective drivers of the plurality of currently-available vehicles, wherein driver information of a given driver comprises shift timings of the given driver;
  fuel-station information of the one or more of the plurality of fuel stations, wherein fuel-station information of a given fuel station comprises at least one of: a status of fuel availability, a current queue, a location, a fuel-station specification of the given fuel station;

predicting a distance to empty for each of the plurality of currently-available vehicles based on the vehicle information;

selecting, from amongst the plurality of currently-available vehicles, one or more eligible vehicles that satisfy eligibility criteria, the eligibility criteria being satisfied by a vehicle when:
   a sum of a distance from a current location of the vehicle to the pickup location, a distance from the pickup location to the drop location and a distance from the drop location to a nearest available fuel station is less than the distance to empty for the vehicle, and
   the ride is expected to be completed before a current shift of a driver of the vehicle ends; and
allocating a vehicle from amongst the one or more eligible vehicles that is nearest to the pickup location.

In a third aspect, an embodiment of the present disclosure provides a computer readable medium containing program instruction for execution on a computer system, which when executed by a computer, cause the computer to perform method steps of allocating vehicles to ride requests.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides a system for allocating vehicles to ride requests, wherein the system comprises a server arrangement and a database arrangement, the server arrangement being coupled in communication with a plurality of rider devices, a plurality of driver devices, a plurality of vehicles and a plurality of fuel stations, the database arrangement storing information pertaining to a plurality of riders associated with respective rider devices, a plurality of drivers associated with respective driver devices, the plurality of vehicles and the plurality of fuel stations, wherein the server arrangement is configured to:
   receive, from a given rider device, a ride request comprising information indicative of a pickup location and a drop location of a given ride;
   identify one or more of the plurality of fuel stations within a predefined distance from the drop location;
   access, from the database arrangement,
      vehicle information of a plurality of currently-available vehicles, wherein vehicle information of a given vehicle comprises at least one of: a current status of fuel, a current location, a state of health, a vehicle specification of the given vehicle;
      driver information of respective drivers of the plurality of currently-available vehicles, wherein driver information of a given driver comprises shift timings of the given driver;
      fuel-station information of the one or more of the plurality of fuel stations, wherein fuel-station information of a given fuel station comprises at least one of: a status of fuel availability, a current queue, a location, a fuel-station specification of the given fuel station;
   predict a distance to empty for each of the plurality of currently-available vehicles based on the vehicle information;
   select, from amongst the plurality of currently-available vehicles, one or more eligible vehicles that satisfy eligibility criteria, the eligibility criteria being satisfied by a vehicle when:
      a sum of a distance from a current location of the vehicle to the pickup location, a distance from the pickup location to the drop location and a distance from the drop location to a nearest available fuel station is less than the distance to empty for the vehicle, and
      the ride is expected to be completed before a current shift of a driver of the vehicle ends; and
   allocate a vehicle from amongst the one or more eligible vehicles that is nearest to the pickup location.

In another aspect, an embodiment of the present disclosure provides a method for allocating vehicles to ride requests, the method comprising:
   receiving, from a given rider device, a ride request comprising information indicative of a pickup location and a drop location of a given ride;
   identifying one or more of a plurality of fuel stations within a predefined distance from the drop location;
   accessing, from a database arrangement,
      vehicle information of a plurality of currently-available vehicles, wherein vehicle information of a given vehicle comprises at least one of: a current status of fuel, a current location, a state of health, a vehicle specification of the given vehicle;

driver information of respective drivers of the plurality of currently-available vehicles, wherein driver information of a given driver comprises shift timings of the given driver;

fuel-station information of the one or more of the plurality of fuel stations, wherein fuel-station information of a given fuel station comprises at least one of: a status of fuel availability, a current queue, a location, a fuel-station specification of the given fuel station;

predicting a distance to empty for each of the plurality of currently-available vehicles based on the vehicle information;

selecting, from amongst the plurality of currently-available vehicles, one or more eligible vehicles that satisfy eligibility criteria, the eligibility criteria being satisfied by a vehicle when:

a sum of a distance from a current location of the vehicle to the pickup location, a distance from the pickup location to the drop location and a distance from the drop location to a nearest available fuel station is less than the distance to empty for the vehicle, and the ride is expected to be completed before a current shift of a driver of the vehicle ends; and allocating a vehicle from amongst the one or more eligible vehicles that is nearest to the pickup location.

Embodiments of the present disclosure provide the aforementioned system and method. The system employs information pertaining to the plurality of riders, the plurality of drivers, the plurality of vehicles and the plurality of fuel stations so as to allocate vehicles to ride requests. Beneficially, the system receives the aforesaid information in real time or near real time. The allocation of the vehicles to the ride requests is implemented in a dynamic manner to ensure that vehicles remain operational for longer and more riders are serviced, thereby achieving optimum utilization of vehicles by increasing the number of trips and reducing on-road breakdowns of the vehicle. An on-road breakdown of a vehicle may be due to insufficient fuel available to complete a ride. The on-road breakdown may also be due to deterioration in the vehicle's condition; for example, the vehicle's battery (in case of an electric vehicle) may face issue with respect to charge retention, battery leakage, swelling or bloating, abnormal battery drain and the like.

The server arrangement is coupled in communication with the database arrangement. The server arrangement is configured to access the information that is stored at the database arrangement.

Pursuant to embodiments of the present disclosure, a rider device is employed by a rider to request a ride.

According to an embodiment, the rider request further comprises a time of pickup of the given ride, wherein the eligibility criteria is satisfied by the vehicle when the vehicle is expected to reach the pickup location from its current location by the time of pickup of the given ride. Optionally, in this regard, the time of pickup comprises a pickup date and a pickup time. In this regard, the rider may employ the rider device to specify a time and date for scheduling a ride. Thus, the rider can beneficially schedule the ride in advance.

Throughout the present disclosure, the term "rider device" refers to an electronic computing device which may execute and run various types of software to perform the computational tasks. The rider device may or may not be hand held. Examples of the rider device include, but are not limited to, a mobile device, a smartphone, a desktop computer, a laptop computer, a Chromebook, a tablet computer, and a specialized dedicated device (e.g. a POS machine).

It will be appreciated that if the rider is a new rider, then the rider may be required to provide the server arrangement with his personal information (for example, name, address, date of birth, mobile contact, emergency contact, blood group) and/or payment details (such as bank account details, card details, payment wallet details and the like), such that a profile of the rider may be created via a mobile application or website of a mobility service provider. The profile of the new rider is then stored at the database arrangement. The profile is employed to keep a log of all the trips that the rider requested using a mobility service provided by the server arrangement.

Pursuant to embodiments of the present disclosure, the vehicle information of a given vehicle comprises at least one of: a current status of fuel, a current location, a state of health, a vehicle specification of the given vehicle. In an implementation, the vehicle information of the given vehicle is communicated by an On-Board Diagnostics (OBD) system of the given vehicle to the server arrangement. In another implementation, a driver device associated with a driver of the given vehicle is employed to communicate the vehicle information to the server arrangement. In such an implementation, the OBD system could be coupled to the driver device. As an example, the driver device could communicate information about the current status of fuel and the current location.

Optionally, the vehicle specification includes at least one of: displacement of the engine, kerb weight, cylinder, horsepower, acceleration of the given vehicle, range (distance covered) on a full fuel tank or a full battery capacity.

It will be appreciated that OBD systems are generally known in the field of vehicle diagnostics. Optionally, the OBD system employs a standardized digital communications port to provide real-time data in addition to a standardized series of diagnostic trouble codes, or DTCs, which enables the server arrangement to identify malfunctions within the vehicle.

It will also be appreciated that the vehicle information is stored in the database arrangement associated with the server arrangement. A record of information pertaining to all the vehicles that are associated with the mobility service provider is stored in the database arrangement, which can be accessed by the server arrangement.

The driver information of a given driver is communicated by the given driver to the server arrangement via a driver device associated with the given driver. Throughout the present disclosure, the term "driver device" refers to an electronic computing device which may execute and run various types of software to perform the computational tasks. The driver device may or may not be hand held. Examples of the driver device include, but are not limited to, a mobile device, a smartphone, a laptop computer, a Chromebook, and a tablet computer.

The driver information of the given driver comprises shift timings of the given driver. Each driver may be requested to create a profile with the mobility service provider. Such a profile can be created using the driver device. The profile of the driver comprises personal information of the driver (for example, name, address, date of birth, mobile contact, emergency contact, blood group, drivers' license issued by any authority). Also, the driver may be required to provide details of any previous or ongoing legal cases that may be filed against the driver in any court of law. Moreover, the driver may be required to provide details of any existing or prior traffic infraction or tickets that have been issued against the driver. The aforementioned information may be utilized by the mobility service provider to create the profile of the driver. Such a profile is optionally continually updated based on any new information.

Optionally, the driver information can also comprise a vehicle preference of the driver. The vehicle preference could be based on a personal preference of the driver. Alternatively, the vehicle preference could be based on a legal permit or clearance provided by the relevant authority to the driver. Optionally, the vehicle preference of the driver is utilized to allot a given vehicle to the driver at the beginning of his shift.

Optionally, the fuel-station information of a given fuel station is communicated to the server arrangement by a monitoring device that is associated with the given fuel station. The monitoring device is coupled in communication with the server arrangement. The monitoring device associated with the given fuel station is employed to monitor and/or control at least one of: real-time fuel usage, the status of fuel availability, the current queue at the given fuel station. Optionally, in this regard, the given fuel station comprises at least one highly-sensitive sensor coupled to each fuel-dispensing unit that enables the fuel-dispensing unit to dispense accurate quality and quantity of fuel. The at least one highly-sensitive sensor is beneficially coupled to the monitoring device.

Optionally, a given fuel station provides as a fuel at least one of: petrol, diesel, ethanol, compressed natural gas, electric energy, hydrogen, fuel cell, automotive Liquefied Petroleum Gas (LPG).

Moreover, optionally, a given fuel station is mobile. Such a mobile fuel station is employed to dispense fuel to one or more vehicles on the go. Such a mobile fuel station can be operated by specially fitting one or more portable gas station containers upon a vehicle. Such a mobile fuel station can further be provided with highly sensitive sensors, so as to dispense accurate quality and quantity of fuel. In general, such mobile fuel station is enabled with Global Positioning System (GPS) and Geo-fencing, such that the mobile fuel station is monitored in real-time, to ensure the utmost transparency. Optionally, in such a case, the monitoring device is employed to track the location of the given fuel station.

It will be appreciated that in case of electric vehicles (EV), a mobile EV charging station can either be integrated with an existing charging infrastructure or be totally self-contained. Such mobile EV charging stations are powered through solar panels, batteries, or any other self-contained electricity generating systems. In an implementation, the mobile EV charging station is a battery-based system that is required to be recharged using an existing electrical infrastructure and delivers energy to electric vehicles whenever and wherever needed. Since the mobile EV charging station is a stand-alone unit, it can be easily transportable. Each mobile EV charging station can charge multiple vehicles per working day, ensuring that a fleet of vehicles is efficiently maintained and utilized. Additionally, such a mobile EV charging station can be supported by a full-featured software platform for intelligent energy and asset management.

Furthermore, the aforementioned system and method are employed to allocate a vehicle from amongst the one or more eligible vehicles that is nearest to the pickup location of a particular ride request. As mentioned earlier, the one or more eligible vehicles are selected from amongst the plurality of currently-available vehicles. Throughout the present disclosure, the term "currently-available vehicles" refers to vehicles that are available for allocation to a ride request. The currently-available vehicles encompass vehicles that are currently unallocated and are ready to fulfil a ride request as well as vehicles that are currently allocated and are about to complete their existing rides within a predefined time period (and are about to be made available to a new ride request). The predefined time period may, for example, be 5 minutes, 10 minutes and so on. Moreover, optionally, the predefined time period lies between a range of 2 to 20 minutes.

Optionally, the server arrangement is configured to consider only those vehicles that are within a pre-defined distance of the pickup location as the currently-available vehicles.

Moreover, optionally, in order to determine a distance from the drop location to a nearest available fuel station, the server arrangement is configured to identify one or more of the plurality of fuel stations within a predefined distance from the drop location. From amongst the one or more of the plurality of fuel stations, the fuel station that is nearest to the drop location can be beneficially ascertained.

Optionally, the server arrangement is configured to predict the distance to empty for each of the plurality of currently-available vehicles based also on local information, wherein the local information comprises at least one of: current weather, current temperature, en-route weather, en-route temperature, drop-location weather, drop-location temperature, current traffic, en-route traffic.

Throughout the present disclosure, the term "local information" refers to information pertaining to weather as well as traffic encountered by a given vehicle on a route that is likely to be opted by the given vehicle. In this regard, the prediction of the distance to empty is continually updated, and locally resolved weather data and traffic data is made available to the server arrangement for route selection during, or even before commencing, the trip.

Optionally, Machine Learning (ML) is employed to analyse, determine and predict a fuel consumption of a vehicle based on change in weather and/or traffic conditions. A predictive model can be developed by learning historical patterns in data collected over a period of time. In an embodiment, machine learning techniques (for example, such as random forest technique, gradient boosting and/or neural networks) are employed to predict the distance to empty for each of the currently-available vehicles based on the aforesaid local information. Optionally, throughout the trip, the predicted distance to empty is continually monitored.

In an embodiment, the aforementioned distance to empty for each of the currently-available vehicles (predicted based on the local information) is further combined with the vehicle information and the driver information to generate reliable predictions of energy consumption. In such a case, the driver information is indicative of a driving style of a given driver.

Optionally, the server arrangement is configured to fill any gaps in the vehicle information and/or the fuel-station information by employing another predictive model. This is particularly beneficial when a given vehicle, a given driver device or a given fuel station is unable to communicate with the server arrangement due to network outage or any other reason. In such a case, the predictive model can be employed to fill any gaps based on historic information available with the server arrangement. Moreover, optionally, in case the vehicle information and/or the fuel-station information have not been updated for a given duration (due to network outage), then latest-collected vehicle information and/or fuel-station information is scaled up using a calculated correction factor, which changes dynamically based on recent history. In case of a temporary outage of both the vehicle information and the fuel-station information, a pure weighted prediction is used based on historic data. In case of outages in the fuel-station information, the server arrangement is configured to predict the current status of one or more fuel dispensing units at the given fuel station. This is again predicted based on the historic data, deviations, and downtime in the one or more fuel dispensing units.

As previously stated, a given fuel station may be mobile. Additionally, optionally, the server arrangement is configured to determine a location at which the given fuel station and the vehicle are to meet for re-fueling of the vehicle, based on a current location of the given fuel station and the current location of the vehicle; and communicate the determined location to the given fuel station and the driver of the vehicle. In such a case a mobile fuel station can be directed to meet a vehicle for refuelling purposes. It will be appreciated, that there may arise a scenario when the vehicle may not be able to reach a fixed fuel station. This may be due to a detour taken by the rider or due to re-routing of the vehicle due to other extraneous considerations (such as traffic and/or weather). In such a case when the vehicle may not be able to reach a fixed fuel station, a mobile fuel station is employed to meet the vehicle for re-fuelling.

Moreover, optionally, the server arrangement is configured to determine a route from the current location of vehicle to the location at which the given fuel station and the vehicle are to meet for re-fueling of the vehicle, and communicate the route to the vehicle, and further determine a route from the current location of the given fuel station to the location at which the given fuel station and the vehicle are to meet for re-fueling of the vehicle, and communicate the route to the given fuel station. The aforementioned route communicated to the given fuel station and the vehicle enables both to reach a common location without any hassle.

The present disclosure also concerns the aforesaid method. Various embodiments of the present disclosure apply mutatis mutandis to the aforesaid method.

Optionally, a given fuel station provides as a fuel at least one of: petrol, diesel, ethanol, compressed natural gas, electric energy, hydrogen, fuel cell, automotive Liquefied Petroleum Gas (LPG).

Moreover, optionally, a given fuel station is mobile

According to an embodiment, the method further comprises:
determining a location at which the given fuel station and the vehicle are to meet for re-fueling of the vehicle, based on a current location of the given fuel station and the current location of the vehicle; and
communicating the determined location to the given fuel station and the driver of the vehicle.

According to an embodiment, the method further comprises:
determining a route from the current location of vehicle to the location at which the given fuel station and the vehicle are to meet for re-fueling of the vehicle, and communicating the route to the vehicle;
determining a route from the current location of the given fuel station to the location at which the given fuel station and the vehicle are to meet for re-fueling of the vehicle, and communicating the route to the given fuel station.

According to an embodiment, the method further comprises predicting the distance to empty for each of the plurality of currently-available vehicles based also on local information, wherein the local information comprises at least one of: current weather, current temperature, en-route weather, en-route temperature, drop-location weather, drop-location temperature, current traffic, en-route traffic.

According to an embodiment, the rider request further comprises a time of pickup of the given ride, wherein the eligibility criteria is satisfied by the vehicle when the vehicle is expected to reach the pickup location from its current location by the time of pickup of the given ride. In order to ensure that the rider is provided a timely pickup, the rider may be allowed to particularly specify a time at which the rider wishes to schedule the ride. In such a case, the eligibility criteria may be further be filtered, thereby ensuring that the vehicle is reaches the pickup location from its current location before the time of pickup of the given ride.

In a third aspect, an embodiment of the present disclosure provides a computer readable medium containing program instruction for execution on a computer system, which when executed by a computer, cause the computer to perform method steps of allocating vehicles to ride requests.

DETAILED DESCRIPTION OF THE DRAWINGS

Figure 1:
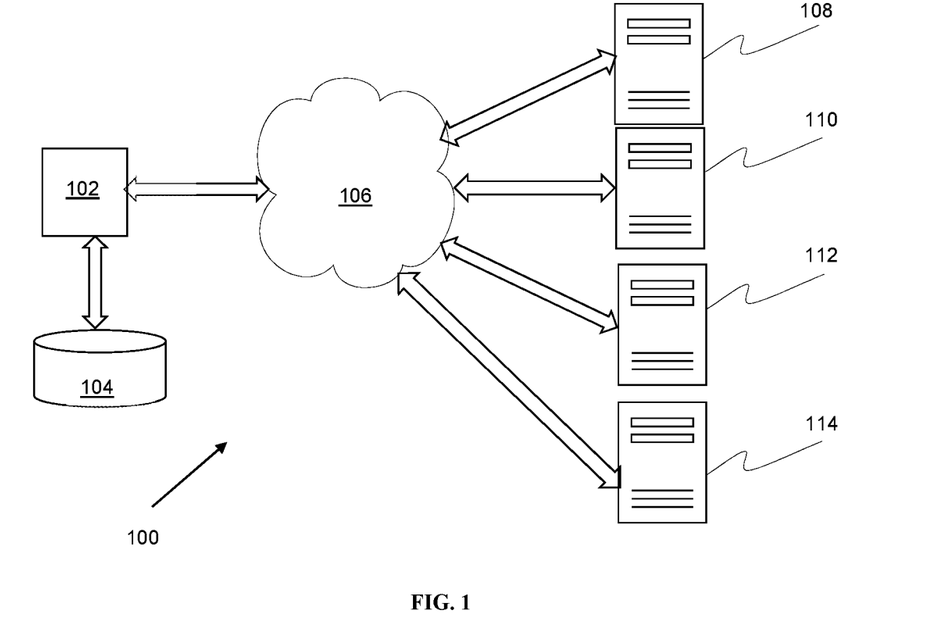
FIG. 1 is a schematic illustration of a network environment in which a system for allocating vehicles to ride requests can be implemented, in accordance with an embodiment of the present disclosure.

Referring to FIG. 1, illustrated is a network environment in which a system 100 for allocating vehicles to ride requests can be implemented, in accordance with an embodiment of the present disclosure. The system 100 comprises a server arrangement 102 and a database arrangement 104. The server arrangement 102 is coupled in communication through a data communication network 106 with a plurality of rider devices 108, a plurality of driver devices 110, a plurality of vehicles 112 and a plurality of fuel stations 114.

It will be appreciated that FIG. 1 depicts a simplified schematic illustration of the system 100, for the sake of clarity, which should not unduly limit the scope of the claims herein. A person skilled in the art will recognize many variations, alternatives and modifications of embodiments of the present disclosure.

Figure 2:
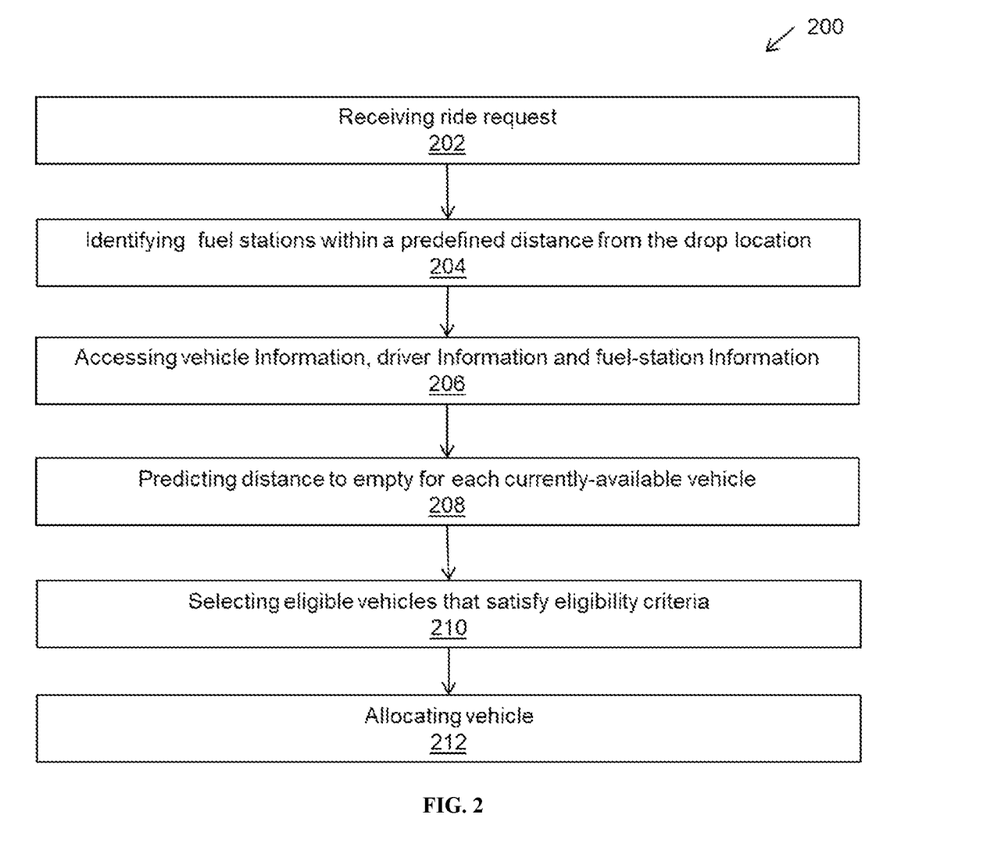
FIG. 2 is a flow chart depicting a method for allocating vehicles to ride requests, in accordance with an embodiment of the present disclosure.

Referring to FIG. 2, illustrated are steps of a method for allocating vehicles to ride requests, in accordance with an embodiment of the present disclosure. At a step 202, a ride request comprising information indicative of a pickup location and a drop location of a given ride is received from a given rider device. At a step 204, one or more of a plurality of fuel stations are identified within a predefined distance from the drop location. At a step 206, vehicle information of a plurality of currently-available vehicles, wherein vehicle information of a given vehicle comprises at least one of: a current status of fuel, a current location, a state of health, a vehicle specification of the given vehicle; driver information of respective drivers of the plurality of currently-available vehicles, wherein driver information of a given driver comprises shift timings of the given driver; fuel-station information of the one or more of the plurality of fuel stations, wherein fuel-station information of a given fuel station comprises at least one of: a status of fuel availability, a current queue, a location, a fuel-station specification of the given fuel station is accessed, from a database arrangement. At a step 208, a distance to empty for each of the plurality of currently-available vehicles is predicted based on the vehicle information. At a step 210, one or more eligible vehicles that satisfy eligibility criteria are selected from amongst the plurality of currently-available vehicles. The eligibility criteria being satisfied by a vehicle when a sum of a distance from a current location of the vehicle to the pickup location, a distance from the pickup location to the drop location and a distance from the drop location to a nearest available fuel station is less than the distance to empty for the vehicle, and the ride is expected to be completed before a current shift of a driver of the vehicle ends. At a step 212, a vehicle from amongst the one or more eligible vehicles that is nearest to the pickup location is allocated.

The aforementioned steps are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A system for allocating vehicles to ride requests, wherein the system comprises:
    a server arrangement wherein the server arrangement is coupled in communication with a plurality of rider devices, a plurality of driver devices, a plurality of vehicles and a plurality of fuel stations, via a data communication network;
    a database arrangement coupled in communication with the server arrangement, wherein the database arrangement is configured to store information pertaining to a plurality of riders associated with respective rider devices, a plurality of drivers associated with respective driver devices, the plurality of vehicles and the plurality of fuel stations, wherein the server arrangement is configured to:
        receive, from a given rider device, a ride request comprising information indicative of a pickup location and a drop location of a given ride, wherein the ride request is requested by a rider;
        identify one or more of the plurality of fuel stations within a predefined distance from the drop location;
        access, from the database arrangement,
            a vehicle information of a plurality of currently-available vehicles, wherein the vehicle information of a given vehicle comprises at least one of: a current status of fuel, a current location, a state of health, a vehicle specification of the given vehicle;
            a first driver information of respective drivers of the plurality of currently-available vehicles, wherein driver information of a given driver comprises shift timings of the given driver;
            a fuel-station information of the one or more of the plurality of fuel stations, wherein fuel-station information of a given fuel station comprises at least one of: a status of fuel availability, a current queue, a location, a fuel-station specification of the given fuel station;
        develop a first predictive model to predict the vehicle information and the fuel station information based on a historic information of the vehicle information and the fuel-station information respectively, wherein the first predictive model is employed to fill gaps in the vehicle information and the fuel-station information based on the historic information available with the server arrangement, wherein the predicted vehicle information and the fuel station information is scaled up using a correction factor, and wherein the correction factor is dynamically adjusted based on the historic information;
        obtain a local information, wherein the local information comprises: current weather, current temperature, en-route weather, en-route temperature, drop-location weather, drop-location temperature, current traffic and en-route traffic;
        predict a distance to empty for each of the plurality of currently-available vehicles based on obtained local information, wherein machine learning is employed to predict the distance to empty based on the obtained local information;
        develop a second predictive model to predict the distance to empty by learning historical patterns in the local information collected over a period of time;
        combine the distance to empty predicted based on the local information with the vehicle information and a second driver information to generate predictions of energy consumption, wherein the second driver information is indicative of driving style of the given driver;
        select, from amongst the plurality of currently-available vehicles, one or more eligible vehicles that satisfy eligibility criteria, the eligibility criteria being satisfied by a vehicle when:
            a sum of a distance from a current location of the vehicle to the pickup location, a distance from the pickup location to the drop location and a distance from the drop location to a nearest available fuel station is less than the combined distance to empty for the vehicle,
            the given ride is expected to be completed before a current shift of a driver of the vehicle ends;
            the vehicle is expected to reach the pickup location from the current location before a time of pickup of the given ride, wherein the time of pickup of the given ride is sent in the ride request; and
        allocate a vehicle from amongst the one or more eligible vehicles that is nearest to the pickup location of the ride request by the rider,
            wherein the first predictive model and the second predictive model employ machine learning techniques for updating the first predictive model and the second predictive model based on learning the historical patterns, and wherein the historical patterns are data collected by the first predictive model and the second predictive model over a period of time.

2. The system of claim 1, wherein a given fuel station provides as a fuel at least one of: petrol, diesel, ethanol, compressed natural gas, electric energy, hydrogen, fuel cell, automotive Liquefied Petroleum Gas (LPG).

3. The system of claim 2, wherein a given fuel station is mobile.

4. The system of claim 3, wherein the server arrangement is configured to:
    determine a location at which the given fuel station and the vehicle are to meet for re-fueling of the vehicle, based on a current location of the given fuel station and the current location of the vehicle; and
    communicate the determined location to the given fuel station and the driver of the vehicle.

5. The system of claim 4, wherein the server arrangement is configured to:
    determine a route from the current location of vehicle to the location at which the given fuel station and the vehicle are to meet for re-fueling of the vehicle, and communicate the route to the driver of the vehicle;

determine a route from the current location of the given fuel station to the location at which the given fuel station and the vehicle are to meet for re-fueling of the vehicle, and communicate the route to the given fuel station.

6. A method for allocating vehicles to ride requests, the method comprising:

receiving, from a given rider device, a ride request comprising information indicative of a pickup location and a drop location of a given ride, wherein the ride request is requested by a rider;

identifying one or more of a plurality of fuel stations within a predefined distance from the drop location;

accessing, from a database arrangement,
- a vehicle information of a plurality of currently-available vehicles, wherein the vehicle information of a given vehicle comprises at least one of: a current status of fuel, a current location, a state of health, a vehicle specification of the given vehicle;
- a first driver information of respective drivers of the plurality of currently-available vehicles, wherein the driver information of a given driver comprises shift timings of the given driver;
- a fuel-station information of the one or more of the plurality of fuel stations, wherein fuel-station information of a given fuel station comprises at least one of: a status of fuel availability, a current queue, a location, a fuel-station specification of the given fuel station;

developing a first predictive model to predict the vehicle information and the fuel station information based on a historic information of the vehicle information and the fuel-station information respectively, wherein the first predictive model is employed to fill gaps in the vehicle information and the fuel-station information based on the historic information available with the server arrangement, wherein the predicted vehicle information and the fuel station information is scaled up using a correction factor, and wherein the correction factor is dynamically adjusted based on the historic information;

obtaining a local information, wherein the local information comprises: current weather, current temperature, en-route weather, en-route temperature, drop-location weather, drop-location temperature, current traffic and en-route traffic;

predicting a distance to empty for each of the plurality of currently-available vehicles based on the vehicle information, wherein machine learning is employed to predict the distance to empty based on the obtained local information;

developing a second predictive model to predict the distance to empty by learning historical patterns in the local information collected over a period of time;

combining the distance to empty predicted based on the local information with the vehicle information and a second driver information to generate predictions of energy consumption, wherein the second driver information is indicative of driving style of the given driver;

selecting, from amongst the plurality of currently-available vehicles, one or more eligible vehicles that satisfy eligibility criteria, the eligibility criteria being satisfied by a vehicle when:
- a sum of a distance from a current location of the vehicle to the pickup location, a distance from the pickup location to the drop location and a distance from the drop location to a nearest available fuel station is less than the distance to empty for the vehicle, and
- the given ride is expected to be completed before a current shift of a driver of the vehicle ends; and
- the vehicle is expected to reach the pickup location from the current location before a time of pickup of the given ride, wherein the time of pickup of the given ride is sent in the ride request; and allocating a vehicle from amongst the one or more eligible vehicles that is nearest to the pickup location of the ride request requested by the rider,
  wherein the first predictive model and the second predictive model employ machine learning techniques for updating the first predictive model and the second predictive model based on learning the historical patterns, and wherein the historical patterns are data collected by the first predictive model and the second predictive model over a period of time.

7. The method of claim 6, wherein a given fuel station provides as a fuel at least one of: petrol, diesel, ethanol, compressed natural gas, electric energy, hydrogen, fuel cell, automotive Liquefied Petroleum Gas (LPG).

8. The method of claim 7, wherein a given fuel station is mobile.

9. The method of claim 8, wherein the method further comprises:

determining a location at which the given fuel station and the vehicle are to meet for re-fueling of the vehicle, based on a current location of the given fuel station and the current location of the vehicle; and communicating the determined location to the given fuel station and the driver of the vehicle.

10. The method of claim 9, wherein the method further comprises:

determining a route from the current location of vehicle to the location at which the given fuel station and the vehicle are to meet for re-fueling of the vehicle, and communicating the route to the driver of the vehicle;

determining a route from the current location of the given fuel station to the location at which the given fuel station and the vehicle are to meet for re-fueling of the vehicle, and communicating the route to the given fuel station.

11. A computer program product comprising a non-transitory computer-readable storage medium having computer-readable instructions stored thereon, the computer-readable instructions being executable by a computerized device comprising processing hardware to execute a method as claimed in claim 6.

* * * * *